United States Patent [19]

Purits

[11] Patent Number: 5,543,741
[45] Date of Patent: Aug. 6, 1996

[54] RESET CIRCUIT FOR GENERATING RESET PULSE OVER AN INTERVAL OF REDUCED VOLTAGE SUPPLY

[75] Inventor: Valentin Purits, Heuvelton, N.Y.

[73] Assignee: Mitel Corporation, Canada

[21] Appl. No.: 366,671

[22] Filed: Dec. 30, 1994

[51] Int. Cl.[6] .................................................. H03L 7/00
[52] U.S. Cl. ........................ 327/143; 327/142; 327/198
[58] Field of Search ................................ 327/141, 142, 327/143, 77, 198, 545, 546; 326/94; 340/661, 663

[56] References Cited

U.S. PATENT DOCUMENTS

| | | | |
|---|---|---|---|
| 4,245,150 | 1/1981 | Driscoll et al. | 327/143 |
| 4,367,423 | 1/1983 | Hornung | 327/143 |
| 4,429,236 | 1/1984 | Nitschke | 307/362 |
| 4,607,178 | 8/1986 | Sugie et al. | 307/594 |
| 4,788,454 | 11/1988 | Tanagawa et al. | 307/296 R |
| 4,788,462 | 11/1988 | Vesce et al. | 327/142 |
| 4,902,910 | 2/1990 | Hsieh | 327/143 |
| 5,027,006 | 6/1991 | Queinnec et al. | 327/143 |
| 5,313,112 | 5/1994 | Macks | 327/143 |

Primary Examiner—Timothy P. Callahan
Assistant Examiner—Kenneth B. Wells
Attorney, Agent, or Firm—Laff, Whitesel, Conte & Saret, Ltd.

[57] ABSTRACT

A reset circuit comprising first apparatus for providing a reset pulse, second apparatus for enabling the first apparatus to start the reset pulse, third apparatus for detecting a voltage drop from an initial voltage supply and for enabling the second apparatus in response to the detection, and apparatus for delaying the interval of the reset pulse until restoration of the full initial supply voltage.

14 Claims, 2 Drawing Sheets

RESET CIRCUIT FOR GENERATING RESET PULSE OVER AN INTERVAL OF REDUCED VOLTAGE SUPPLY

FIELD OF THE INVENTION

This invention relates to an automatic reset circuit for providing a reset signal with reliability.

BACKGROUND TO THE INVENTION

An automatic reset circuit is used to restart a circuit such as a microprocessor based circuit after a power interruption. Such reset circuits have not operated reliably in many cases, such as when there are multiple short power interruptions within a short period of time, or when the voltage from a power supply drops only a small amount to a marginal value of the operation voltage required by the microprocessor based circuit.

In such cases data corruption and unreliable resetting, including lock-up, can occur.

In attempts to avoid the aforenoted problems, circuits have been designed which block enable inputs of random access memories used in microprocessor based circuits, after power supply voltage decays to a level slightly above (e.g. 4.7 volts) the marginal value (e.g. 4.5 volts) of its operation voltage (5.0 volts). These circuits drain some current from a battery assigned for memory backup, which shortens battery life. Some circuits produce a reset pulse after the operation voltage restores. None of these circuits have been able to reliably provide a reset pulse beginning immediately when the operation voltage drops and ending when the operation voltage has reliably become restored.

SUMMARY OF THE INVENTION

The present invention, on the other hand reliably detects a drop in the operation voltage and provides a reset pulse beginning immediately when the operation voltage drops and ends when the operation voltage has reliably become restored.

In accordance with an embodiment of the present invention, a reset circuit comprises first apparatus for providing a reset pulse, second apparatus for enabling said first apparatus to start the reset pulse, third apparatus for detecting a voltage drop from an initial voltage supply and for enabling the second apparatus in response to the detection, and apparatus for delaying the interval of the reset pulse until restoration of the full initial supply voltage.

In accordance with another embodiment, in the reset circuit the first apparatus is an operational amplifier having a threshold voltage applied to its inverting input, and a noninverting input connected to the voltage supply which is higher than the threshold voltage, and the second apparatus includes a switch for switching the noninverting input of the operational amplifier to a voltage lower than the threshold voltage upon being enabled by said third apparatus.

In accordance with another embodiment, a reset circuit comprises an operational amplifier having an inverting input and a noninverting input, and an output for providing a reset pulse, and apparatus for providing a first threshold voltage applied to its inverting input, a first bipolar transistor having its emitter connected to a first pole of a supply voltage and its base connected through a first capacitor and first resistor to another pole of the supply voltage, a second bipolar transistor having its base connected in a circuit to the other pole of the supply voltage and its emitter connected through a second resistor to a second capacitor, another terminal of the second capacitor being connected to the other pole of the supply voltage, the junction of the second capacitor and the second resistor being connected through a third resistor to the first pole of the supply voltage and to the noninverting input of the operational amplifier, and apparatus for maintaining the second transistor nonconductive with conduction and operation of the first transistor, and conductive to discharge the second capacitor to a voltage less than the first threshold voltage applied to the inverting input of the operational amplifier with nonconduction of the first transistor whereby a reset pulse is initiated by the operational amplifier.

BRIEF DESCRIPTION OF THE DRAWINGS

A better understanding of the invention will be obtained by reading the description of the invention below, with reference to he following drawings, in which.

DETAILED DESCRIPTION OF THE PREFERRED EMBODIMENTS

Figure 1:
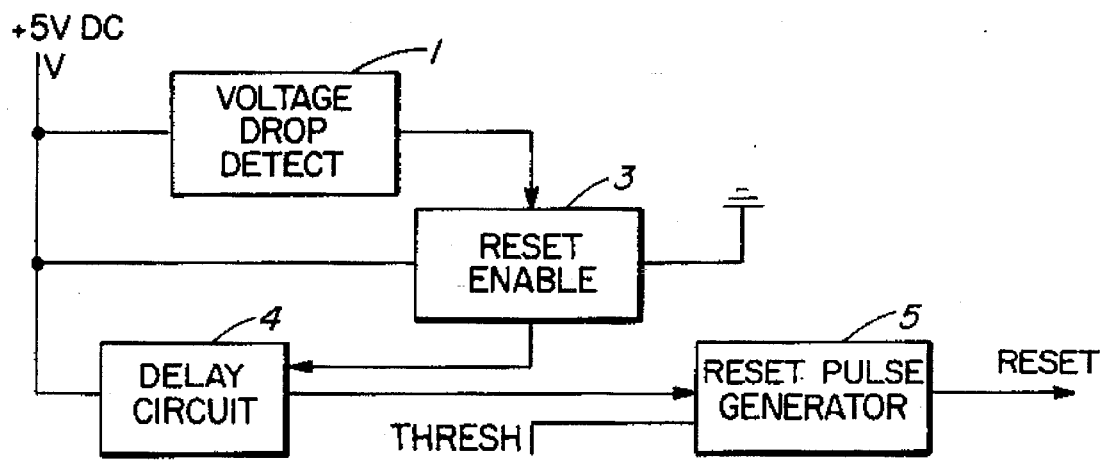
FIG. 1 is a block schematic of the present invention.

With reference to FIG. 1, a circuit 1 for detecting a voltage drop from a voltage source V is connected to a reset enabling circuit 3. The enabling circuit 3, via a delay circuit 4, is connected to a reset pulse generating circuit 5, which provides a reset pulse at its output.

The circuit 1 for detecting a voltage drop detects a minute voltage drop from a nominal voltage value of the voltage source, e.g. a drop of the value of a threshold conduction voltage of a bipolar transistor, and immediately causes operation of the reset enabling circuit 3 to enable the reset pulse generating circuit 5 to begin a reset pulse. The beginning of the reset pulse will be detected by a circuit which is to be protected, which will shut down.

Preferably if the voltage source value decreases to a level at the reset pulse generator below a predetermined threshold (THRESH, in FIG. 1), it can hold the reset pulse following its enabling without the enabling circuit.

When the voltage of the voltage source restores, the enabling circuit can be delayed in allowing the reset pulse generating circuit from terminating the reset pulse until all danger of multiple dropouts or sagging of the voltage value is decreased. This time can be made to be variable. Termination of the reset pulse allows the circuit that is being protected to be reset.

Figure 2:
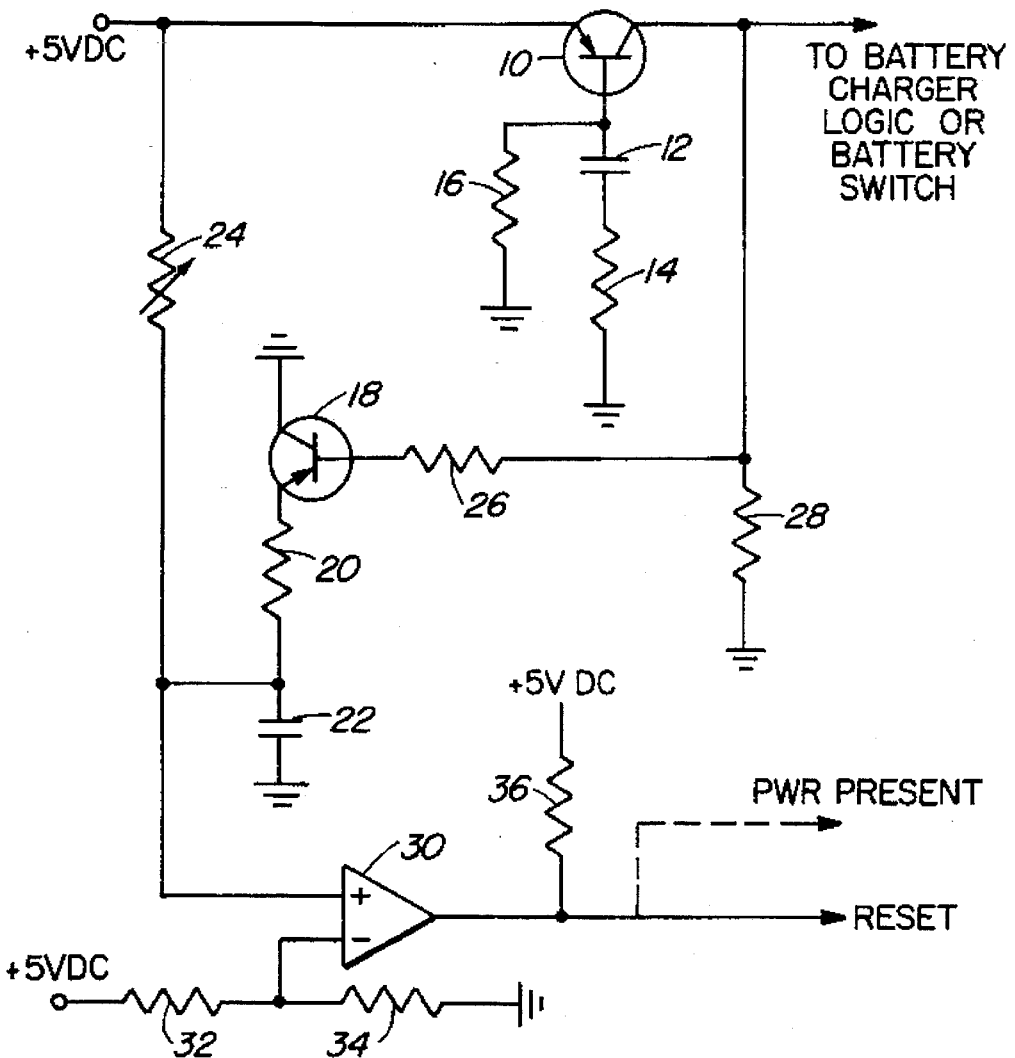
FIG. 2 is a schematic of a preferred embodiment of the present invention.

FIG. 2 is a schematic diagram of a preferred embodiment of the present invention.

The circuit for detecting the voltage drop is comprised of a bipolar transistor 10 (PNP type in the embodiment illustrated), having its emitter connected to the voltage source to be monitored, shown as +5 VDC. A capacitor 12 in series with a resistor 14 are connected between the base of the transistor 10 and ground. A bias resistor 16 is also connected between the base of transistor 10 and ground.

The collector of transistor 10 is typically connected to an external circuit, such as digital logic and a memory backup in a battery switch circuit for a power down condition.

3

In operation, the emitter-base circuit of transistor 10 conducts, and capacitor 12 charges through resistor 14. Once it has charged up, the base of transistor 10 is one threshold of operation voltage value below the emitter.

The time constant of capacitor 12 and resistor 14 should be very small, e.g. microseconds. The value of resistor 16 should be much larger than that of resistor 14, e.g. 100 k ohms.

The enable circuit is preferably comprised of a second PNP transistor 18. Its collector is connected to ground, and its emitter is connected through a resistor 20 in series with a capacitor 22 to ground. The time constant of resistor 20 and capacitor 22 should also be very short, of microseconds.

The junction of capacitor 22 and resistor 20 is connected through a high value resistor 24 (e.g. 620 k ohms) to the voltage source +5 VDC. Resistor 24 can be made as a variable resistor.

The base of transistor 18 is connected through a resistor 26 to the collector of transistor 10, which is connected to ground via resistor 28.

The reset pulse generator comprises an operational amplifier 30, which has its noninverting input connected to the junction of resistors 24 and 20. Its inverting input is connected to the junction of a voltage divider formed of a series of two resistors 32 and 34 connected between +5 VDC and ground. The output of the operational amplifier is connected through a resistor 36 to +5 VDC, and provides a reset (or power present) signal.

In operation, transistor 10 conducts via resistor 16 and resistor 28, from voltage source +5 VDC to ground. Capacitor 12 becomes charged up, nearly to the value of +5 VDC. Due to conduction of transistor 10, transistor 18 cannot conduct due to its emitter-base junction being shunted by the transistor 10 being saturated.

With transistor 18 not conducting, the voltage at the noninverting input of the operational amplifier 30 is +5 VDC, (the voltage at its inverting input being less due to the voltage division by resistors 32 and 34), and the output voltage level of the operational amplifier is high. This is represented at an early time in FIG. 3B which illustrates the power voltage +5 VDC being high and the reset level being high.

Figure 3A:
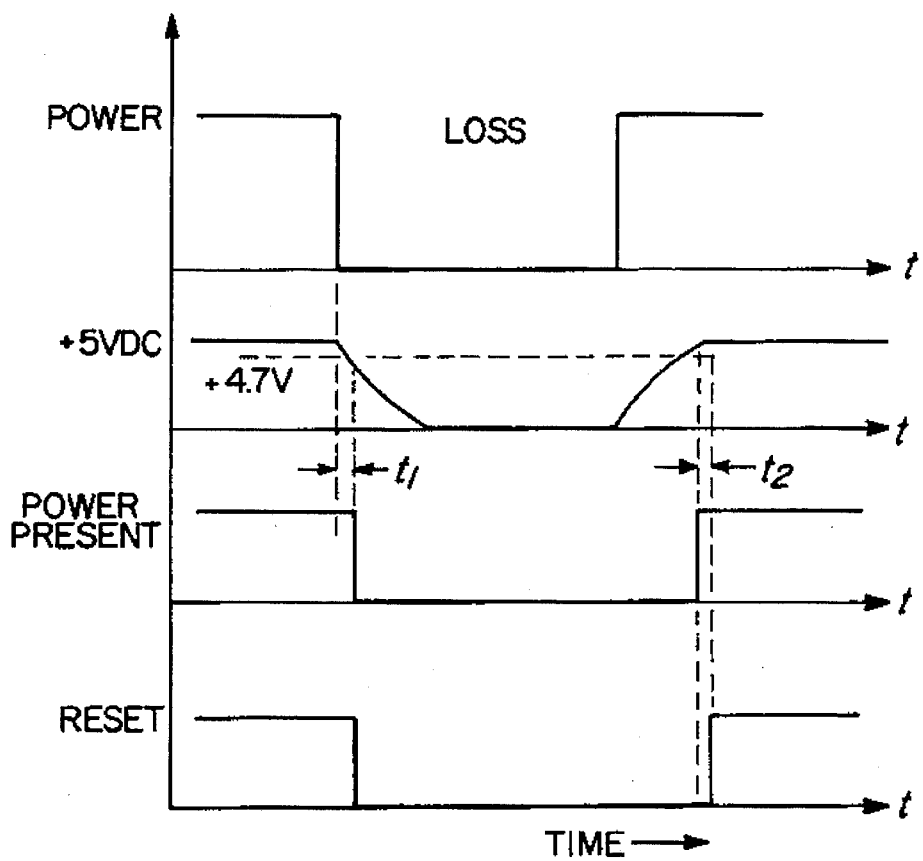
FIGS. 3A and 3B are timing diagrams illustrating signals in the prior art and in the present invention, respectively.
Figure 3B:
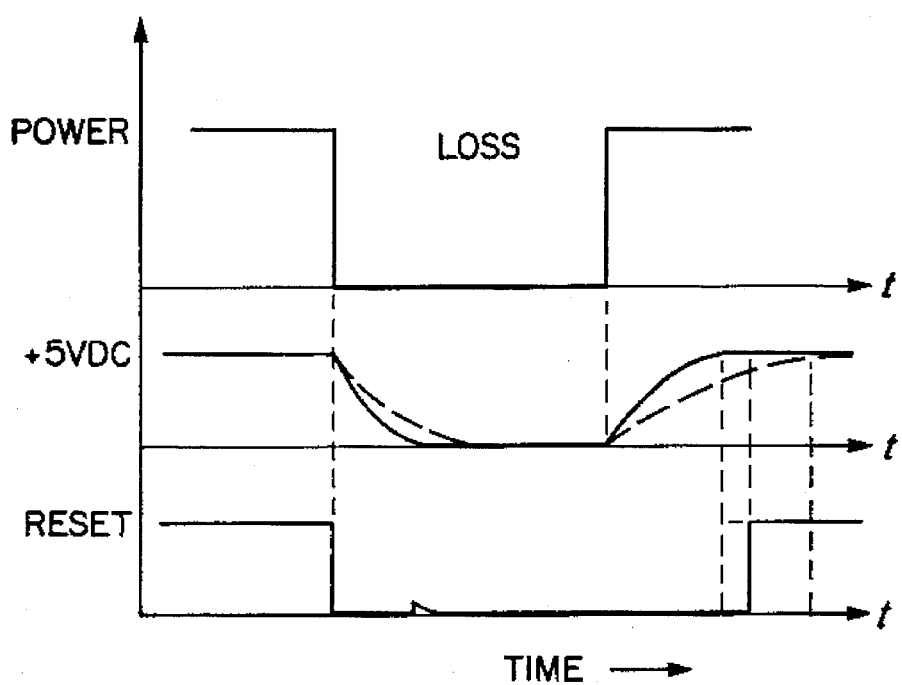

Now assume that there is a power loss, as illustrated by the POWER signal in FIG. 3B. The emitter voltage of transistor 10 will begin dropping at a rate illustrated by the solid line in the +5 VDC, the rate being determined by external circuits which have capacitors which discharge. As soon as the voltage at the emitter of transistor 10 drops below the value that can maintain the emitter-base junction conductive (the base potential is held by capacitor 12), operation of transistor 10 cannot be sustained.

With transistor 10 not being operational, the shunt around transistor 18 is eliminated. Ground voltage level is applied through resistors 28 and 26 to the base of transistor 18, turning transistor 18 on. This allows capacitor 22 to quickly discharge through resistor 20 and transistor 18 (microseconds).

With sudden discharge of capacitor 22, the voltage level at the noninverting input of operational amplifier 30 suddenly goes to low voltage level, as shown at the leading edge of the RESET signal shown in FIG. 3B.

Termination of conduction of transistor 10 also stops the degrading DC voltage supply from passing through it to external digital circuitry or a battery switch, if it is connected to it.

4

As the +5 VDC voltage degrades, it eventually drops below the value of the THRESH voltage at the junction of resistors 32 and 34. The output of operational amplifier 30 then will remain at low logic level, without the aid of the enable circuit, due to the low supply voltage. The level at which this can occur is set by the values of the voltage divider resistors 32 and 34.

It may be seen that the reset signal pulse is initiated reliably and suddenly with very little voltage drop of the +5 VDC supply voltage, the small portion of a single emitter-base threshold voltage of a transistor just enough to disable it.

When the power feed voltage is restored, i.e. as shown in the POWER signal shown in FIG. 3B, the voltage begins rising at the +5 VDC input, as shown by the solid line. However, with capacitor 22 discharged, the noninverting input of operational amplifier 30 is maintained low. Capacitor 20 is slowly charged from the +5 VDC input through resistor 24, which can be e.g. 62 milliseconds or more. Only when the voltage on capacitor 22 reaches above the THRESH voltage at the inverting input of operational amplifier 30 does its output signal rise to high logic level, as illustrated by the solid rise line at the end of the RESET pulse in FIG. 3B. External circuits receiving the end of the RESET pulse are thereby reset and become reoperational.

It should be noted that for systems in which the +5 VDC has slow recovery, the end of the reset pulse can be delayed for a long time. For example, with resistor 24 one megohm and capacitor 22 one microfarad the reset pulse termination can be delayed for more than a second. Variation in the reset instant is evident from the dashed lines in the +5 VDC and RESET signals in FIG. 3B, which shows a slow voltage recovery, and corresponding delayed terminating edge of the RESET pulse, or fast voltage recovery and corresponding earlier terminating edge of the RESET pulse.

This should be compared with the prior art case of the signals shown in FIG. 3A. In this case when the power loss occurs, it is only sensed when the +5 VDC voltage has dropped to e.g. 4.7 volts, as shown on the +5 VDC curve. That delays the leading edges of the POWER PRESENT logic level and RESET pulse by a time t1, which in some instances is enough for an EPROM to be corrupted.

When the power voltage recovers, as shown in the POWER curve, the +5 VDC voltage begins to rise. When it reaches the +4.7 volt level, the POWER PRESENT logic level logic level goes high. Typically the RESET pulse logic level trailing edge occurs a time t2 following the POWER PRESENT logic level recovery. There is no possibility of delaying the end of the RESET pulse a variable time, or a time desired by the designer to ensure that a power supply transient interval has passed.

The voltage on capacitor 12 follows the transistor 10 emitter voltage (minus the emitter-base junction voltage drop). Thus with restoration of the full +5 VDC, the circuit restores itself to the condition of transistor 10 conducting and transistor 18 shunted and not conducting, as at the beginning of this explanation.

However, if the next power interruption occurs immediately after the first, even during the +5 VDC voltage rise time, the process as described earlier repeats since the voltage on capacitor 12 follows the transistor 10 emitter voltage (minus the emitter-base junction voltage drop).

It should be noted that the circuit can be used as a power present indicator circuit, since the output of operational amplifier 30 will be at high logic level (+5 VDC) in the presence of power, and will be at low logic level in the absence of power.

While the circuit has been described with reference to a positive power supply voltage and PNP bipolar transistors, a person skilled in the art will recognize that the invention can be realized using NPN bipolar transistors and negative power supply voltage. Alternatively other semiconductors could be used, while using the principles of the present invention; the use of the term transistor is thus intended to be construed to mean any semiconductor or switch which will fulfill the corresponding function in a design which utilizes the principles of the present invention.

A person understanding this invention may now conceive of alternative structures and embodiments or variations of the above. All of those which fall within the scope of the claims appended hereto are considered to be part of the present invention.

I claim:

1. A reset circuit comprising:
   (a) first means for providing a reset pulse,
   (b) second means connected to the first means for enabling said first means to stag said reset pulse,
   (c) third means connected to the second means for detecting a voltage drop of an initial supply voltage below a threshold and for enabling said second means in response to said detection,
   (d) means for extending a length of the reset pulse until a time of restoration of a full initial supply voltage
   (e) said third means comprising a first transistor in series with a first resistor between a source of said initial supply voltage and ground,
   (f) means connected to the first transistor for charging a capacitor through the first transistor from said voltage supply,
   (g) means connected to the first transistor for causing the first transistor to conduct in response to a on the first capacitor,
   (h) means connected to the first transistor and to the second means for inhibiting said second mean, and
   (i) means connected to the first transistor and to the second means for inhibiting conduction of the first transistor and for enabling said second means as a result thereof upon said supply voltage dropping below the voltage of the charge on the capacitor.

2. The reset circuit as defined in claim 1 in which said second means comprises a second transistor connected in a circuit to the first transistor and being inoperative in the presence of conduction by the first transistor, a second capacitor connected to the second transistor and charged by the supply voltage, and means connected to the second capacitor for discharging the second capacitor through the second transistor upon operation and conduction of the second transistor thereby enabling said first means.

3. The reset circuit as defined in claim 2 further including a variable resistor connected between the second capacitor and the supply voltage for controlling the charge time of the second capacitor and length of the reset pulse.

4. The reset circuit as defined in claim 3 in which said first means comprises an operational amplifier having a noninverting input connected to the second capacitor and an inverting input connected to a voltage source, and means for providing the reset pulse from the output of the operational amplifier.

5. A reset circuit comprising:
   (a) an operational amplifier having an inverting input and a noninverting input, and an output for providing a reset pulse,
   (b) means for providing a first threshold voltage connected to an inverting input of the operational amplifier,
   (c) a first bipolar transistor having its emitter connected to a first pole of a supply voltage and its base connected through a first capacitor and first resistor to another pole of the supply voltage,
   (d) a second bipolar transistor having its base connected in a circuit to said other pole of the supply voltage and its emitter connected through a second resistor to a second capacitor, another terminal of the second capacitor being connected to said other pole of the supply voltage,
   (e) the junction of the second capacitor and the second resistor being connected through a third resistor to the first pole of the supply voltage and to the noninverting input of the operational amplifier, and
   (f) means for causing the second transistor to be nonconductive with conduction and operation of the first transistor, and for causing the second transistor to be conductive and discharge the second capacitor to a voltage less than the first threshold voltage applied to the inverting input of the operational amplifier upon nonconduction of the first transistor whereby a reset pulse is initiated by the operational amplifier.

6. The reset circuit as defined in claim 5 in which the time constant of the first capacitor and first resistor is of the order of microseconds.

7. The reset circuit as defined in claim 5 in which the time constant of the second capacitor and second resistor is of the order of microseconds.

8. The reset circuit as defined in claim 5 in which the time constant of the second capacitor and third resistor is between about ½ second and 2 seconds.

9. The reset circuit as defined in claim 5 in which the third resistor is variable.

10. The reset circuit as defined in claim 5 in which the first pole of the supply voltage is positive and the transistors are PNP types.

11. The reset circuit as defined in claim 1 in which the first means comprises an operational amplifier having a threshold voltage applied to its inverting input, and a noninverting input connected to said voltage supply which is higher than the threshold voltage, the second means including a switch for switching the noninverting input of the operational amplifier to a voltage lower than the threshold voltage upon being enabled by said third means.

12. The reset circuit as defined in claim 11 in which the second means comprises a first capacitor in series with a discharge path, connected to the noninverting input of the operational amplifier, the discharge path being inhibited from conducting prior to the second means being enabled, and being enabled to conduct and discharge the first capacitor to ground, thereby bringing the noninverting input of the operational amplifier to ground.

13. The reset circuit as defined in claim 12 in which the third means comprises a capacitor charged to a voltage at or near the voltage of the voltage supply, and a conductive means which is inhibited from conducting upon the voltage supply becoming less than the voltage of the charge held by the capacitor, cessation of conduction of the conductive means triggering enabling of the second means to switch the noninverting input of the operational amplifier to a voltage lower than the threshold voltage.

14. The reset circuit as defined in claim 12 including a charge resistor in series with the first capacitor to the voltage supply, the charge resistor charging up the first capacitor to form a terminating edge of the reset pulse upon reestablishing initial voltage of the voltage supply following its detected drop with a time constant that delays the termination of the reset pulse to a predetermined extent.

* * * * *